United States Patent
Zhu (10) Patent No.: US 9,020,057 B2
(45) Date of Patent: Apr. 28, 2015

(54) PRECODING FOR WIRELESS SIGNALS (75) Inventor: Chenxi Zhu, Fairfax, VA (US)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 13/361,587

(22) Filed: Jan. 30, 2012

(65) Prior Publication Data

US 2013/0195217 A1    Aug. 1, 2013

(51) Int. Cl.
*H04B 7/02* (2006.01)
*H04L 25/49* (2006.01)
*H04B 7/04* (2006.01)
*H04L 25/02* (2006.01)

(52) U.S. Cl.
CPC ............ *H04L 25/49* (2013.01); *H04L 25/0204* (2013.01); *H04B 7/024* (2013.01); *H04B 7/0456* (2013.01); *H04B 7/0486* (2013.01)

(58) Field of Classification Search
CPC .. H04B 7/0639; H04B 7/0456; H04B 7/0404; H04B 7/0478; H04B 7/0486; H04B 7/0417; H04L 25/03942; H04L 25/03343; H04L 25/03923
USPC ......................................... 375/260, 267, 299
See application file for complete search history.

(56) References Cited

U.S. PATENT DOCUMENTS

| | | | |
|---|---|---|---|
| 2008/0013641 A1* | 1/2008 | Li et al. | 375/262 |
| 2009/0016459 A1* | 1/2009 | Kim et al. | 375/262 |
| 2010/0048233 A1* | 2/2010 | Kim et al. | 455/501 |
| 2010/0103832 A1* | 4/2010 | Zhou et al. | 370/252 |
| 2010/0254474 A1* | 10/2010 | Gomadam et al. | 375/267 |
| 2011/0080901 A1* | 4/2011 | Lin et al. | 370/344 |
| 2011/0158189 A1* | 6/2011 | Kuo et al. | 370/329 |
| 2012/0177011 A1* | 7/2012 | Xi et al. | 370/335 |
| 2012/0207243 A1* | 8/2012 | Koivisto et al. | 375/296 |
| 2013/0034180 A1* | 2/2013 | Liu et al. | 375/267 |
| 2013/0083681 A1* | 4/2013 | Ebrahimi Tazeh Mahalleh et al. | 370/252 |
| 2013/0094604 A1* | 4/2013 | Mondal et al. | 375/295 |
| 2013/0114654 A1* | 5/2013 | Gomadam | 375/219 |
| 2013/0114655 A1* | 5/2013 | Gomadam | 375/219 |
| 2013/0121432 A1* | 5/2013 | Mondal et al. | 375/267 |
| 2013/0208704 A1* | 8/2013 | Hultell et al. | 370/335 |
| 2013/0322567 A1* | 12/2013 | Yu et al. | 375/308 |

OTHER PUBLICATIONS

3rd Generation Partnership Project;Technical Specification Group Radio Access Network; Evolved Universal Terrestrial Radio Access (E-UTRA); Physical channels and modulation (Release 10), TS.36211-a10, Mar. 2011.

(Continued)

*Primary Examiner* — Emmanuel Bayard
(74) *Attorney, Agent, or Firm* — Maschoff Brennan (57) ABSTRACT

A system for determining precoding for a wireless signal may include a derivation module and a selection module. The derivation module may be configured to determine precoding information for a composite channel. The composite channel may represent characterizations of multiple wireless paths established between multiple receiving antennas and multiple transmitting antennas. The transmitting antennas may be distributed among multiple transmission points. The selection module may further be configured to select a codeword for each transmission point from a subset of predefined codewords based on the precoding information. The codeword for each transmission point may be used to manipulate data signals sent over the wireless paths established between the receiving antennas and the transmitting antennas of the respective transmission point.

19 Claims, 5 Drawing Sheets

(56) References Cited

OTHER PUBLICATIONS

3rd Generation Partnership Project;Technical Specification Group Radio Access Network; Evolved Universal Terrestrial Radio Access (E-UTRA); Multiplexing and channel coding (Release 10), TS.36212-a10, Mar. 2011.

3rd Generation Partnership Project;Technical Specification Group Radio Access Network; Evolved Universal Terrestrial Radio Access (E-UTRA); Physical layer procedures (Release 10), TS.36213-a10, Mar. 2011.

3rd Generation Partnership Project;Technical Specification Group Radio Access Network; Evolved Universal Terrestrial Radio Access (E-UTRA); Spatial channel model for MIMO simulations (Release 10), TR25.996 v10.0.0, Mar. 2011.

3GPP TSG RAN50, RP-101425, Revised SID Proposal: Coordinated Multi-Point Operation for LTE , Samsung; Dec. 10, 2010.

RP-110457, "Study on Downlink MIMO Enhancement for LTE-Advanced" Accessed Mar. 18, 2012.

* cited by examiner

PRECODING FOR WIRELESS SIGNALS

FIELD

The embodiments discussed herein are related to wireless communication systems.

BACKGROUND

Many different techniques are being employed to enable wireless communication systems to increase data rates between wireless communication base stations and mobile units. One such technique is coordinated multipoint transmission. In coordinated multipoint transmissions, multiple geographically separated base stations may coordinate to provide joint scheduling and transmission to a single mobile unit and/or to provide joint processing of signals received from the mobile unit. Allowing multiple base stations to communicate with a mobile unit may improve signal reception and transmission and increase data throughput, such as when the mobile unit is located between the base stations.

Additionally, precoding of data signals sent from a transmission point, such as a base station, to a mobile unit allows a wireless communication system to compensate for signal loss of the data signals and to improve data throughput. In wireless communication systems, the precoding of data signals may be performed at a transmission point during downlink transmissions, but either the transmission point or a mobile unit may determine a precoding scheme, referred to as a codeword, that may be applied by the transmission point to the data signals.

Wireless communication systems that provide support for coordinated multipoint transmissions, that is transmissions to a single mobile unit from multiple transmission points, may have the mobile unit or transmission points determine the precoding scheme. In some circumstances, a wireless communication system may have a mobile unit determine the codeword to maintain backwards capability with other communication techniques and equipment employing other standards. In these circumstances, a wireless communication system employing coordinated multipoint transmissions may have a mobile unit determine a codeword for each of the coordinated transmission points. The mobile unit may select the codewords for the coordinated transmission points from a set of predefined codewords. To select the codeword for each transmission point, the mobile unit may make an exhaustive search of the set of codewords. This exhaustive search may be time and resource intensive.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system for determining precoding for a wireless signal may include a derivation module and a selection module. The derivation module may be configured to determine precoding information for a composite channel. The composite channel may represent characterizations of multiple wireless paths established between multiple receiving antennas and multiple transmitting antennas. The transmitting antennas may be distributed among multiple transmission points. The selection module may be configured to select a codeword for each transmission point from a subset of predefined codewords based on the precoding information. The codeword for each transmission point may be used to manipulate data signals sent over the wireless paths established between the receiving antennas and the transmitting antennas of the respective transmission points.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein include a method of determining a precoding scheme that may include deriving precoding information for a composite channel that represents all data paths connected between multiple transmission points and a mobile unit. A codeword for each transmission point from a subset of predefined codewords may be selected based on the derived precoding information to reduce the time and resources to select a codeword. In some embodiments, the codeword for one of the transmission points may be selected independently from the codeword for another of the transmission points.

Embodiments of the present invention will now be explained with reference to the accompanying drawings.

Figure 1:
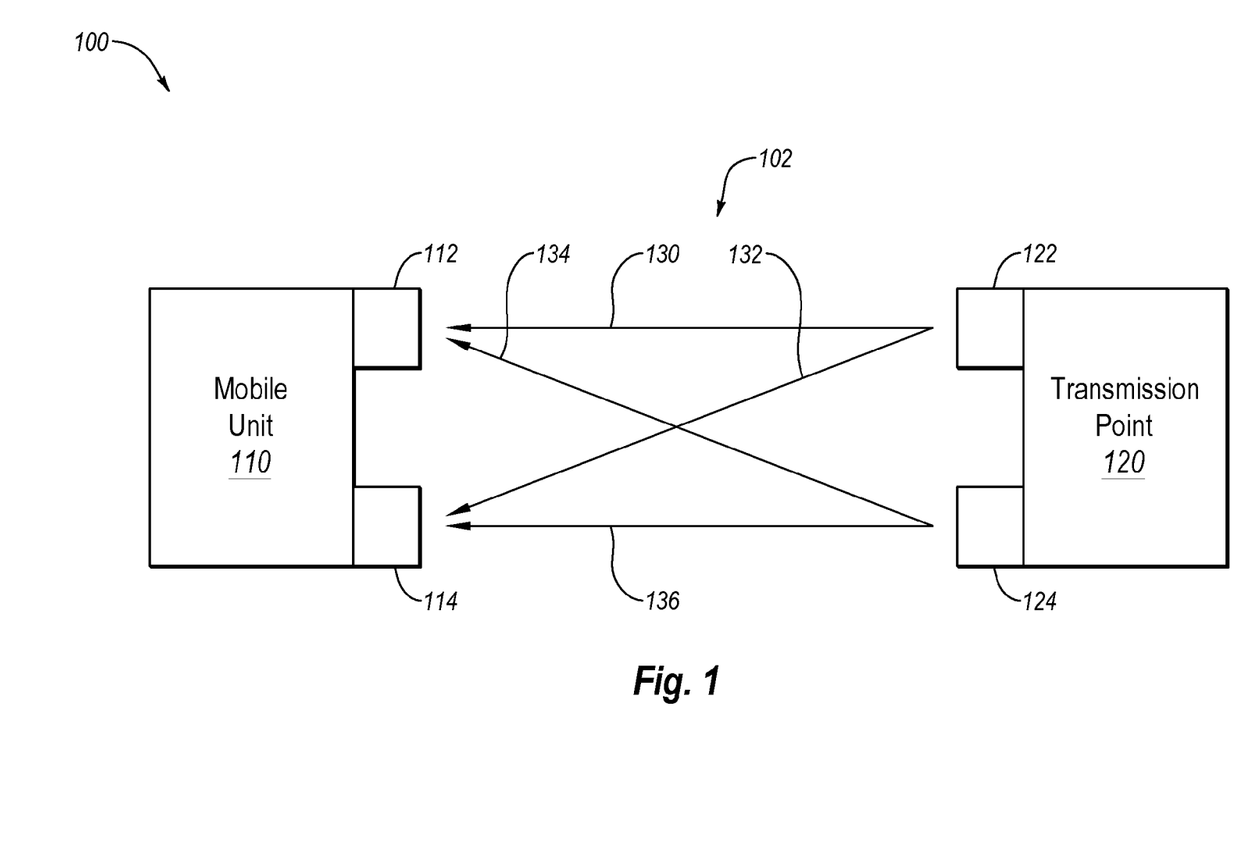
FIG. 1 illustrates a wireless communication system with multiple wireless paths.

FIG. 1 illustrates a wireless communication system 100 with multiple wireless paths 130, 132, 134, 136, arranged in accordance with at least some embodiments described herein. The wireless communication system 100 may include a mobile unit 110 and a transmission point 120. The mobile unit 110 may include a first receiving antenna 112 and a second receiving antenna 114. The transmission point 120 may include a first transmitting antenna 122 and a second transmitting antenna 124. FIG. 1 illustrates the transmission point 120 sending data to the mobile unit 110 in a downlink direction. In some embodiments, the system 100 may also function in reverse and the mobile unit 110 may send data to the transmission point 120 in an uplink direction. In these and other embodiments, the antennas 112, 114 on the mobile unit 110 may be configured as transmitting antennas and the antennas 122, 124 on the transmission point 120 may be configured as receiving antennas.

The mobile unit 110 may be any unit configured to receive data transmissions over a wireless communication network, such as a cellular communication network. For example, the mobile unit 110 may be a wireless phone, such as a smart phone, or a tablet computer, a laptop computer, a gaming console, a music player, a global positioning system device, or any other device configured to receive data transmissions over a wireless communication network. The transmission point 120 may include any device configured to transmit data over a wireless communication network. For example, in some embodiments, the transmission point 120 may include a base station, such as an evolved Node B (EnB) base station, or a remote radio head (RRH) of a cellular communication network, or the like. The transmission point 120 may also include any other type of device configured to transmit data over a wireless communication network, such as a wireless router.

Each transmitting antenna 122, 124 may transmit a data signal to each receiving antenna 112, 114 over different wireless paths. For example, the first transmitting antenna 122 may transmit a first data signal over the wireless path 130 to the first receiving antenna 112 and the first data signal over the wireless path 132 to the second receiving antenna 114. The second transmitting antenna 124 may also transmit a second data signal over the wireless path 134 to the first receiving antenna 112 and the second data signal over the wireless path 136 to the second receiving antenna 114. In some embodiments, the wireless paths 130, 132, 134, 136 may be referred to as channels. In some embodiments, the first and second data signals transmitted by the first and second transmitting antennas 122, 124, respectively, may be the same or different. Additionally or alternatively, the first and second data signals transmitted by the first and second transmitting antennas 122, 124 may be transmitted on the same carrier frequencies. Additionally or alternatively, the first and second data signals transmitted by the first and second transmitting antennas 122, 124 may be transmitted at the same time.

The number of different data signals simultaneously transmitted by the transmission point 120 may be referred to as the number of data streams or layers being transmitted by the transmission point 120. The number of data streams transmitted by the transmission point 120 may be referred to as the rank of transmission for the transmission point 120. For example, when the first and second transmitting antennas 122, 124 each transmit a different data signal, the transmission point 120 may be transmitting two data streams or layers or linear combinations of two data streams or layers and have a rank of two. As another example, when the first and second transmitting antennas 122, 124 each transmit the same data signal, the transmission point 120 may be transmitting one data stream or layer and have a rank of one. The number of streams able to be transmitted by a transmission point may be limited by the lesser of the number of transmitting antennas of a transmission point and the number of the receiving antennas of a mobile unit.

Before transmitting data signals to the mobile unit 110, the transmission point 120 may send reference signals along each of the wireless paths 130, 132, 134, 136 to the mobile unit 110. The references signals may be predetermined signals known by the mobile unit 110 and the transmission point 120. Using the reference signals, the mobile unit 110 may be configured to characterize each of the wireless paths 130, 132, 134, 136. In some embodiments, characterizing the wireless paths 130, 132, 134, 136 may include determining transfer functions or properties of the wireless paths 130, 132, 134, 136. As such, the characterizations of the wireless paths 130, 132, 134, 136 may describe how a data signal propagates between a transmitting antenna and a receiving antenna taking into account the effects of scattering, fading, power decay, and/or other factors that affect wireless data transmissions.

The characterizations of the wireless paths 130, 132, 134, 136 may be combined by the mobile unit 110 to form a composite channel. Using the composite channel, the mobile unit 110 may determine precoding information for the composite channel. The precoding information for the composite channel may represent how to adjust transmitted data signals to conditions of the wireless paths 130, 132, 134, 136 to improve data throughput along the wireless paths 130, 132, 134, 136. The precoding information may be applied to the data signals transmitted by both the first and second transmitting antennas 122, 124.

In some embodiments, the mobile unit 110 may send the determined precoding information to the transmission point 120 for use in precoding transmitted data signals. In some embodiments, to reduce the amount of data transmitted to the transmission point 120 from the mobile unit 110 with respect to the precoding information, the mobile unit 110 may select a codeword that approximates the precoding information from a set of predefined codewords. In some embodiments, the predefined codewords may be from a codebook of predefined codewords used for cellular communications. The set of predefined codewords may be known to both the mobile unit 110 and the transmission point 120. In these and other embodiments, the mobile unit 110 may send an indicator that indicates the selected codeword to the transmission point 120. For example, the mobile unit 110 may send an index that corresponds to a selected codeword in a set of predefined codewords.

In some embodiments, the mobile unit 110 may also determine amplitude and phase rotation for data signals transmitted by the transmission point 120.

In some embodiments, the mobile unit 110 and/or the transmission point 120 may include more than two antennas. For example, the mobile unit 110 and/or the transmission point 120 may include 2, 3, 4, 5, 6, 7, 8, or some other number of antennas. In some embodiments, the mobile unit 110 and the transmission point 120 may have the same number of or a different number of antennas. The number of wireless paths between the mobile unit 110 and the transmission point 120 may be equal to the number of receiving antennas multiplied by the number of transmitting antennas.

Figure 2:
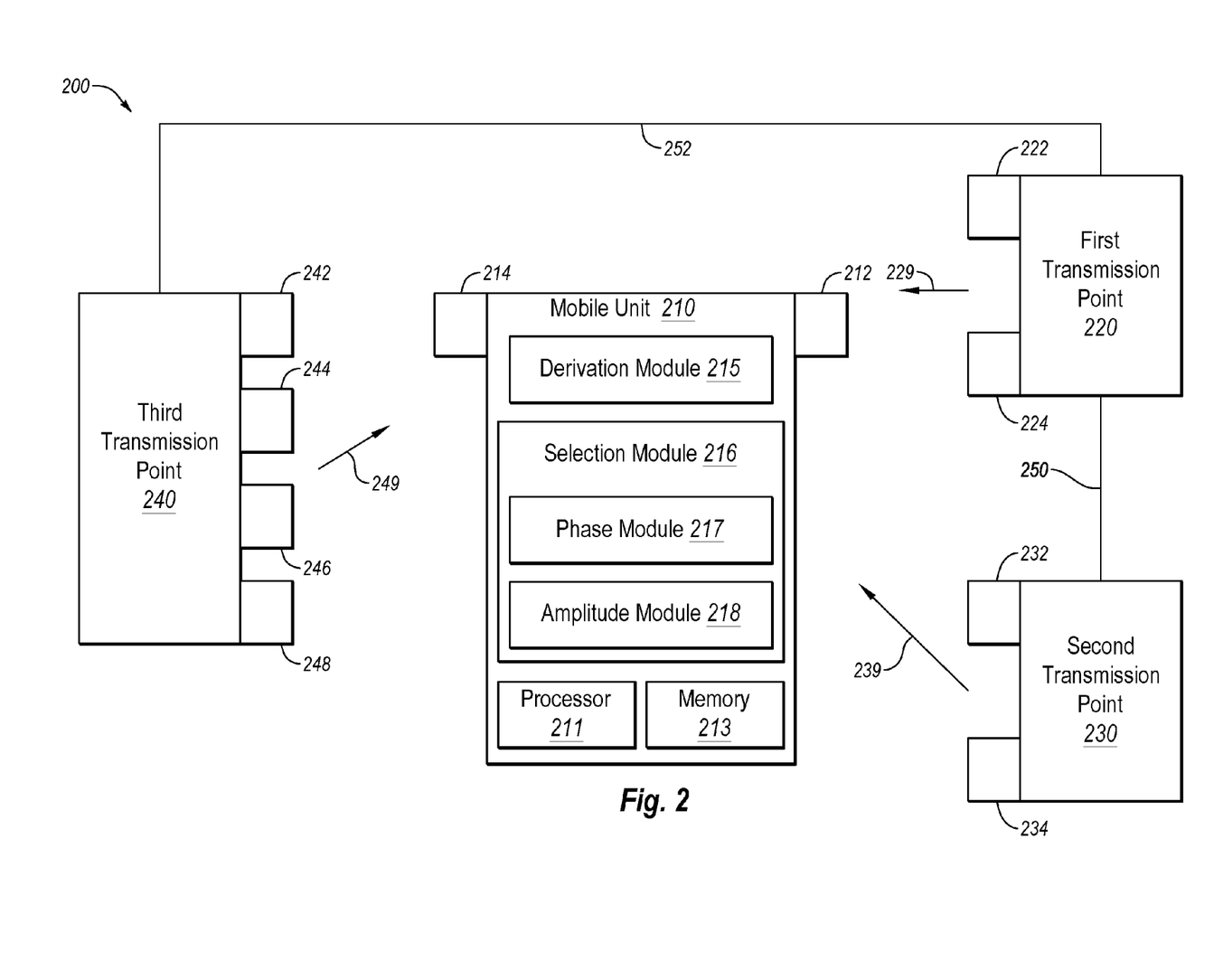
FIG. 2 illustrates a wireless communication system that determines precoding for wireless signals.

FIG. 2 illustrates a wireless communication system 200 that determines precoding for wireless signals, arranged in accordance with at least some embodiments described herein. The wireless communication system 200 may include a mobile unit 210 and first, second, and third transmission points 220, 230, 240. The mobile unit 210 may include receiving antennas 212, 214. The first transmission point 220 may include transmitting antennas 222, 224. The second transmission point 230 may include transmitting antennas 232, 234. The third transmission point 240 may include transmitting antennas 242, 244, 246, 248. FIG. 2 illustrates the transmission points 220, 230, 240 sending data to the mobile unit 210 in a downlink direction. In some embodiments, the system 200 may also function in reverse and the mobile unit 210 may send data to the transmission points 220, 230, 240 in an uplink direction. In these and other embodiments, the antennas 212, 214 on the mobile unit 210 may be configured as transmitting antennas and the antennas 222, 224, 232, 234, 242, 244, 246, 248 on the transmission points 220, 230, 240 may be configured as receiving antennas.

Optionally, the mobile unit 210 may further include at least one of: a processor 211, a memory 213, a derivation module 215, a selection module 216, a phase module 217, and an amplitude module 218.

The mobile unit 210 may be any unit configured to receive data transmissions over a wireless communication network, such as a cellular communication network. For example, the mobile unit 210 may be a wireless phone, such as a smart phone, a tablet computer, a laptop computer, a gaming console, a music player, a global positioning system device, or any other device configured to receive data transmissions over a wireless communication network. The transmission points 220, 230, 240 may include any device configured to transmit data over a wireless communication network. For example, in some embodiments, all of or some combination of the transmission points 220, 230, 240 may be base stations, such as an EnBs, RRHs, or some combination of the same in a cellular communication network. The transmission points 220, 230, 240 may also include any other type of device configured to transmit data over a wireless communication network, such as a wireless router.

Each transmitting antenna 222, 224, 232, 234, 242, 244, 246, 248 may be configured to transmit a data signal to each receiving antenna 212, 214 over different wireless paths. For clarity in FIG. 2, each individual wireless path has not been illustrated. Instead, wireless paths 229, 239, 249 are illustrated to represent the wireless paths between each transmitting antenna 222, 224, 232, 234, 242, 244, 246, 248 and each receiving antenna 212, 214. The wireless path 229 may represent all wireless paths between the transmitting antennas 222, 224 and the receiving antennas 212, 214, which may include four different wireless paths. The wireless path 239 may represent all wireless paths between the transmitting antennas 232, 234 and the receiving antennas 212, 214, which may also include four different wireless paths. The wireless path 249 may represent all wireless paths between the transmitting antennas 242, 244, 246, 248 and the receiving antennas 212, 214, which may include eight different wireless paths.

The transmission points 220, 230, 240 may also be communicatively coupled by data lines 250, 252. By being communicatively coupled, in some embodiments, the transmission points 220, 230, 240 may all transmit the same data signals to the mobile unit 210 and effectuate coordinated multipoint processing. Additionally or alternately, the data signals transmitted by the transmission points 220, 230, 240 may be the transmitted on the same carrier frequencies. Additionally or alternately, the data signals transmitted by the transmission points 220, 230, 240 may be transmitted at the same time.

In some embodiments, before transmitting data signals to the mobile unit 210, each of the transmitting antennas 222, 224, 232, 234, 242, 244, 246, 248 may be configured to send a reference signal to each of the receiving antennas 212, 214. The derivation module 215 of the mobile unit 210 may be configured to characterize the wireless paths 229, 239, 249 between the transmitting antennas 222, 224, 232, 234, 242, 244, 246, 248 and the receiving antennas 212, 214 using the transmitted reference signals.

After characterizing the wireless paths 229, 239, 249, the derivation module 215 may combine the characterizations of the wireless paths 229, 239, 249 into a composite channel. For example, in some embodiments, the derivation module 215 may represent the characterizations of the wireless paths 229, 239, 249 in vector form and the composite channel may be represented in matrix form.

The derivation module 215 may further be configured to determine precoding information for the composite channel. In some embodiments, the derivation module 215 may determine the precoding information by taking a singular value decomposition of the composite channel matrix. In some embodiments, a singular value decomposition of the composite channel matrix may be used that produces singular values in descending order of magnitudes. The singular values may represent the quality of potential data streams transmitted to the mobile unit 210. As described previously, the number of data streams in a system may be limited by the lesser of a number of transmitting antennas of a transmission point and a number of receiving antennas of a mobile unit. Thus, in the embodiments illustrated in FIG. 2, the singular values may represent the quality of two potential data streams.

In some embodiments, based on the quality of the potential data streams, the derivation module 215 may be configured to select the rank of transmission (e.g., the number of potential data streams) for the system 200. In some embodiments, the derivation module 215 may select a rank of transmission based on the quality of the potential data streams being above a threshold value. In circumstances where the quality of both potential data streams is below a threshold value, the derivation module 215 may select the potential data stream with the highest quality. Note that the rank for each transmission point 220, 230, 240 may be the same and may be determined from the composite channel matrix. Thus, in embodiments where one of the transmission points 220, 230, 240 transmits two data streams, all of the transmission points 220, 230, 240 may transmit two data streams.

In some embodiments, when the derivation module 215 selects a rank of transmission that is less than the potential total number of data streams, the derivation module 215 may cull the precoding information to remove information related to the unselected data streams. Culling the precoding information may produce a subset of precoding information that may be used to determine additional information for the system 200. For example, in some embodiments, when the precoding information is in the form of a matrix, the derivation module may cull the matrix by removing rows and/or columns from the matrix that represent the unselected data streams.

In some embodiments, the derivation module 215 may further break the precoding information into blocks of precoding information for each transmission point 220, 230, 240. Each block of precoding information may be analyzed by the selection module 216 of the mobile unit 210 to select a codeword for each respective transmission point 220, 230, 240. In some embodiments, the precoding information may also be analyzed by the selection module 216 to determine amplitude and phase rotation for data signals transmitted to the mobile unit 210 from each respective transmission point 220, 230, 240. In particular, the phase module 217 within the selection module 216 may determine the phase rotation for the transmitted data signals and the amplitude module 218 may determine the amplitude for the transmitted data signals.

In some embodiments, for each block of precoding information, and thus each transmission point 220, 230, 240, the selection module 216 may select a codeword. For ease in explanation, the selection of a codeword for the first transmission point 220 is explained. The selection of the codewords for the second and third transmission points 230, 240 may follow a similar method.

The selection module 216 may first select a subset of codewords from a set of predefined codewords. In some embodiments, the selection module 216 may select the subset of codewords from the set of predefined codewords based on a number of transmitting antennas on the first transmission point 220 and the number of receiving antennas of the mobile unit 210. Thus, in this example, the subset of codewords may correspond to codewords used for two transmitting antennas and two receiving antennas.

The selection module 216 may analyze each codeword in the selected subset of codewords to determine a codeword that manipulates data signals most similar to the precoding information for the first transmission point 220. To analyze each codeword, the phase module 217 and the amplitude module 218 may determine a phase rotation and amplitude rotation, respectively, for the codeword based on the precoding information for the first transmission point 220. In some embodiments, the phase module 217 and the amplitude module 218 may quantize the phase rotation and amplitude, respectively. For example, in some embodiments, the phase rotation may be quantized using 2- or 3-bit phase shift keying.

The selection module 216 may use the determined phase rotation and amplitude together with the selected codeword to determine how well the selected codeword approximates the precoding information. After the selection module 216 analyzes all of the codewords in the selected subset of codewords, the selection module 216 may select the codeword that best approximates the precoding information.

In some embodiments, the mobile unit 210 may send the codeword to the first transmission point 220. In some embodiments, the mobile unit 210 may send an indicator that indicates the selected codeword to the first transmission point 220. For example, the mobile unit 210 may send an index that corresponds to the selected codeword in the set of predefined codewords. In some embodiments, the mobile unit 210 may also send the rank, amplitude, and/or phase rotation to the first transmission point 220. After the first transmission point 220 receives the codeword and/or the rank, amplitude, and/or phase rotation, the first transmission point 220 may use the foregoing to manipulate data signals sent to the mobile unit 210.

As discussed above, the selection module 216 may determine a codeword for the second and third transmission points 230, 240 following a similar method as described with respect to the first transmission point 220. The selection module 216 may also determine amplitude and/or phase rotation for the second and third transmission points 230, 240. The mobile unit 210 may send the selected codeword and/or rank, amplitude and/or phase rotation for the second and third transmission points 230, 240 to the respective second and third transmission points 230, 240. Thus, the mobile unit 210 may select a codeword for each of the transmission points 220, 230, 240 individually based on the precoding information for the respective transmission points 220, 230, 240. In some embodiments, the transmission points 220, 230, 240 may use the selected codewords to send the same data at the same time on the same frequencies to the mobile unit 210.

The derivation module 215, the selection module 216, the phase module 217, and the amplitude module 218 may be implemented in hardware, firmware, software, or some combination thereof. In some embodiments, the processor 211 of the mobile unit 210 may be configured to execute computer instructions. For example, one or more of the derivation module 215, the selection module 216, the phase module 217 and/or the amplitude module 218 may be implemented as computer instructions. The computer instructions may be embodied as program code and/or may be loaded to the memory 210 for execution by the processor 208. Execution of the computer instructions by the processor 211 may cause the mobile unit 210 to perform operations for determining precoding for a wireless signal, such as those operations described herein. Various example operations for determining precoding for a wireless signal are described below with respect to FIGS. 3 and 4.

The above process of determining precoding information and a rank, and selecting a codeword and determining an amplitude and phase rotation based on the precoding information and the rank, may be completed based on a variation rate of the wireless paths. The variation rate of a wireless path may include how often the characteristics of the wireless path change and may depend on one or more factors, such as, but not limited to, the local weather with respect to the mobile unit 210 and transmission points 220, 230, 240, a location and/or movement of the mobile unit 210, a location and/or movement of other objects near and/or in the wireless path, or the presence of other wireless signals.

In some embodiments, a codeword may be updated, meaning a new codeword may be selected based on newly determined precoding information and the new codeword may be sent to a transmission point for use in manipulating transmitted data. Although not required, the codeword may be updated periodically, such as about every 20 to 40 milliseconds, to account for variations in the wireless paths. In other embodiments, the codeword may be updated with greater or less frequency or on a non-periodic basis such as only when circumstances so warrant. Additionally or alternately, the phase rotation, rank, and/or amplitude may be updated every time a codeword is updated or the phase rotation, rank, and/or amplitude may be updated with varying frequencies. For example, in some embodiments, the phase rotation may be updated every 20 to 40 millisecond, the rank may be updated every 40 to 100 milliseconds, and the amplitude may be updated every 40 to 60 milliseconds.

In some embodiments, a transmission point may be configured to receive a codeword, amplitude, phase rotation, and/or a rank determined for the transmission point from the mobile unit 210. The transmission point may use the determined codeword, amplitude, phase rotation, and/or rank to encode data signals transmitted to the mobile unit 210. By encoding the data signals transmitted to the mobile unit 210, the transmission point may improve signal transmission and/or increase data throughput for the data connection between the individual transmission point and the mobile unit 210. In some embodiments, the codeword, amplitude phase rotation, and/or rank determined for one transmission point may be the same as or different than the codeword, amplitude phase rotation, and/or rank determined for another transmission point. Thus, in some embodiments, multiple transmission points may send data signals to the mobile unit 210 that are encoded similarly or encoded differently.

In some embodiments, the mobile unit 210 may not send a determined amplitude to a transmission point. For example, in some embodiments, the mobile unit 210 may not send the amplitude to the transmission point to reduce data transmissions between the mobile unit 210 and the transmission point. In these and other embodiments, the transmission point may estimate an amplitude based on factors such as a characterization of a wireless path between the transmission point and the mobile unit 210 using an arbitrary signal. In other embodiments, the transmission point may set the amplitude to one for encoding a data signal.

In some embodiments, the mobile unit 210 may not send a determined phase rotation to a transmission point. For example, in some embodiments, the mobile unit 210 may not send the phase rotation to the transmission point to reduce data transmissions between the mobile unit 210 and the transmission point. In these and other embodiments, the transmission point may set the phase rotation to one for encoding a data signal.

In some embodiments, the mobile unit 210 and/or the transmission points 220, 230, 240 may include more or fewer antennas than those illustrated in FIG. 2. For example, in some embodiments, the mobile unit 210 and/or the transmission points 220, 230, 240 may include 2, 3, 4, 5, 6, 7, 8, or some other number of antennas. In some embodiments, the transmission points 220, 230, 240 may have the same number of or a different number of antennas. The number of wireless paths between the mobile unit 210 and the transmission points 220, 230, 240 may be equal to the number of receiving antennas multiplied by the number of transmitting antennas.

Figure 3:
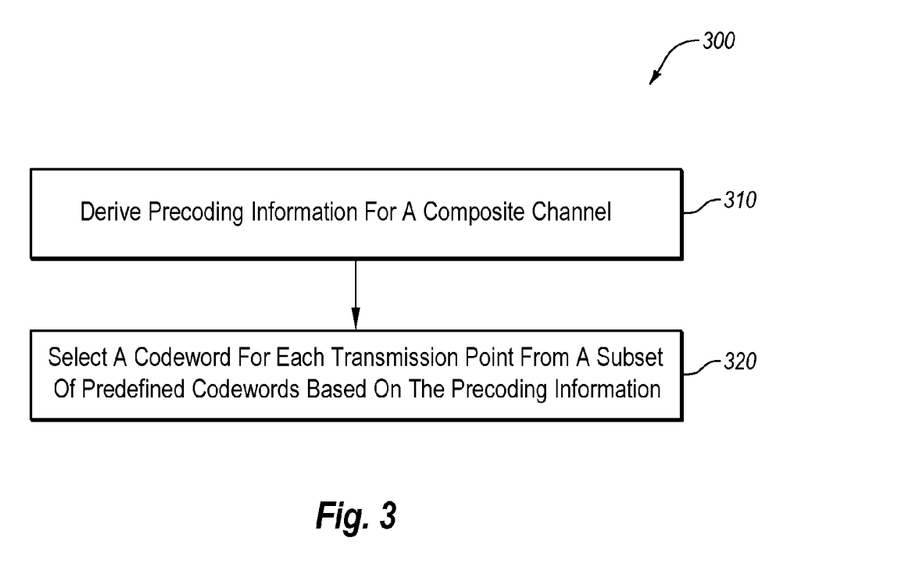
FIG. 3 is a flowchart of an example method of determining precoding for wireless signals.

FIG. 3 is a flowchart of an example method 300 of determining precoding for wireless signals, arranged in accordance with at least some embodiments described herein. The method 300 may be implemented, in some embodiments, by a wireless communication system, such as the wireless communication system 200 of FIG. 2 and, in particular, a mobile unit within the wireless communication system, such as the mobile unit 210. For instance, the processor 211 within the mobile unit 210 of the wireless communication system 200 of FIG. 2 may be configured to execute computer instructions to cause the mobile unit 210 to perform operations for determining precoding for a wireless signal as represented by one or more of blocks 310 and/or 320 of the method 300.

The method 300 may begin at block 310, in which precoding information for a composite channel may be derived. The composite channel may represent characterizations of multiple wireless paths established between multiple receiving antennas and multiple transmitting antennas. In some embodiments, the multiple transmitting antennas may be distributed among multiple transmission points. Additionally or alternately, the composite channel may be configured in the form of a matrix. In these and other embodiments, deriving the precoding information may include performing a singular value decomposition of the composite channel matrix.

Additionally or alternately, the singular values determined while performing the singular value decomposition of the composite channel matrix may indicate the quality of data streams possible within the composite channel matrix. In these and other embodiments, a rank of transmission may be determined based on the quality of data streams relating to a threshold value. For example, in some embodiments, the number of data streams with a quality above a threshold may be the rank of transmission.

In block 320, a codeword for each transmission point from a subset of predefined codewords may be selected based on the precoding information. The selected codeword for each transmission point may be used to manipulate data signals sent over the wireless paths established between the receiving antennas and the transmitting antennas of the respective transmission point. In some embodiments, the codeword for one of the transmission points may be selected independently from the codeword for another of the transmission points.

Additionally or alternately, the codeword for each transmission point may be selected based on a subset of the precoding information. The subset of the precoding information may be selected based on a rank of transmission determined by the derivation module. For example, in some embodiments, based on the rank of transmission, the precoding information may be culled to remove data associated with data streams that are not implemented based on the rank of transmission.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 300 may further include determining a phase rotation, based on the derived precoding information, for data signals sent over the wireless paths established between the receiving antennas and the transmitting antennas of the respective transmission point. Additionally or alternately, the method 300 may further include determining an amplitude, based on the derived precoding information, for data signals sent over the wireless paths established between the receiving antennas and the transmitting antennas of the respective transmission point.

Figure 4A:
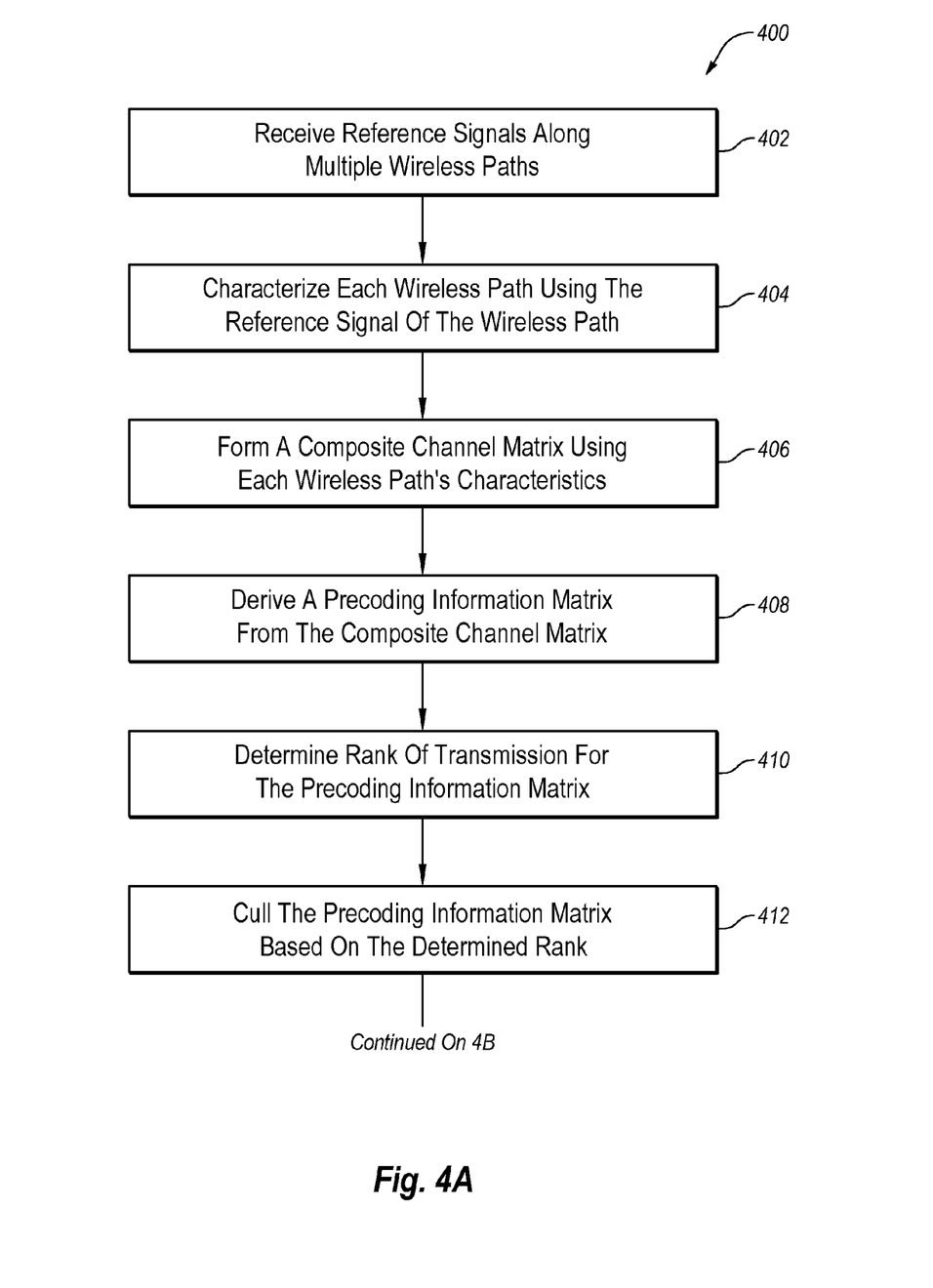
FIGS. 4A-4B illustrate a flowchart of another example method of determining precoding for wireless signals, all arranged in accordance with at least some embodiments described herein.
Figure 4B:
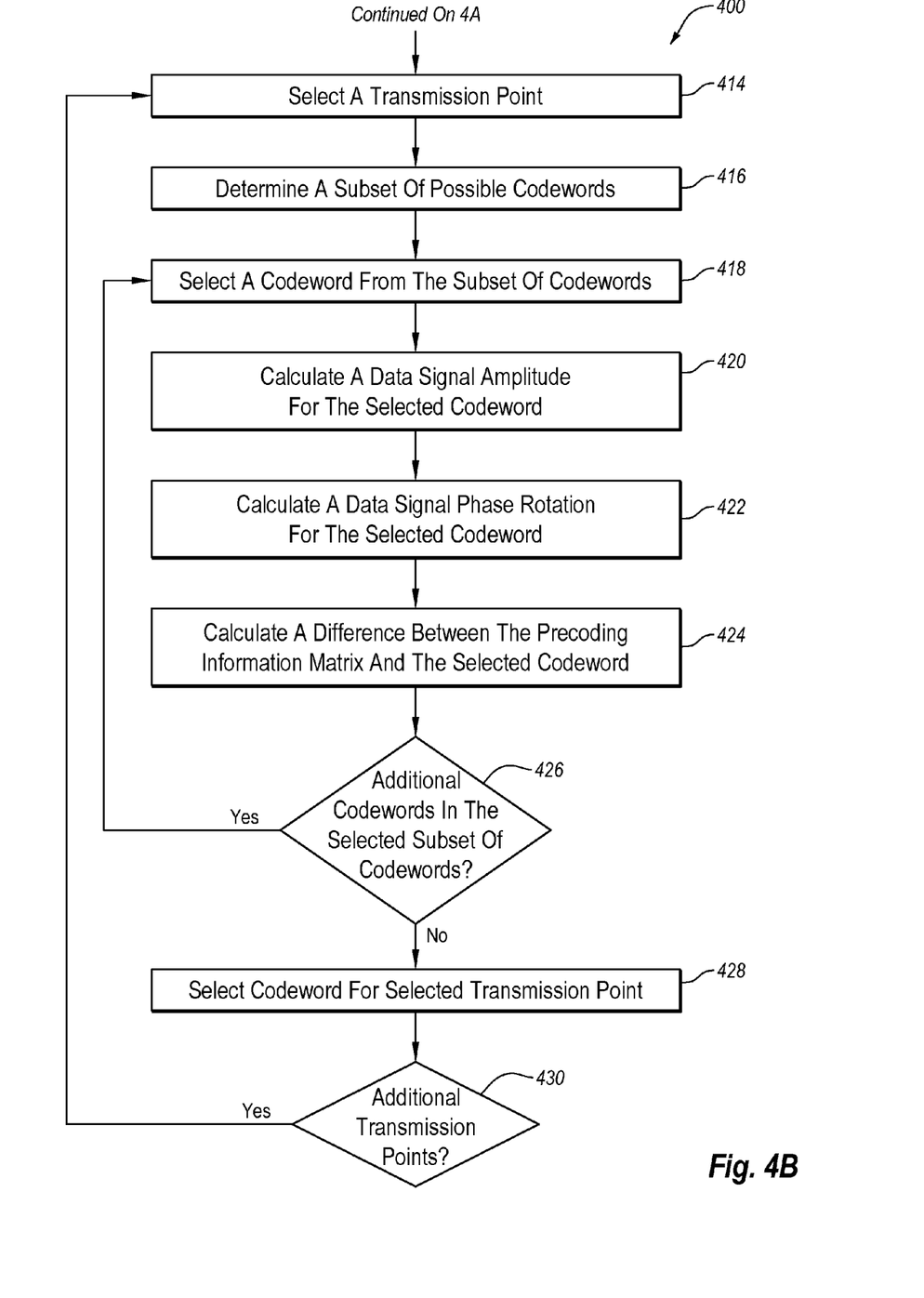

FIGS. 4A-4B illustrate a flowchart of another example method 400 of determining precoding for wireless signals, arranged in accordance with at least some embodiments described herein. The method 400 may be implemented, in some embodiments, by a wireless communication system, such as the wireless communication system 200 of FIG. 2 and, in particular, a mobile unit within the wireless communication system, such as the mobile unit 210. For instance, the processor 211 within the mobile unit 210 of the wireless communication system 200 of FIG. 2 may be configured to execute computer instructions to cause the mobile unit 210 to perform operations for determining precoding for a wireless signal as represented by one or more of blocks 402, 404, 406, 408, 410, 412, 414, 416, 418, 420, 422, 424, 426, 428 and/or 430 of the method 400.

The method 400 may begin at block 402, in which a reference signal along each of multiple wireless paths within a wireless communication system may be received. The wireless paths may be established between N receiving antennas of a mobile unit and M transmitting antennas of multiple transmission points. In some embodiments, the M transmitting antennas may be distributed among K transmission points In block 404, each wireless path may be characterized using the reference signal sent over the wireless path. For example, in some embodiments, characterizing a wireless path may include determining the transfer function and/or other properties of the wireless path. As such, the characterization of the wireless path may describe how a data signal propagates between a transmitting antenna and a receiving antenna taking into account the effects of scattering, fading, power decay, and/or other factors that affect wireless data transmissions.

In block 406, a composite channel matrix H may be formed using each wireless path's characteristics. In some embodiments, the characterizations of the wireless paths between the N receiving antennas and the transmitting antennas of one of the K transmission points may be in vector and/or matrix form. The composite channel matrix H may thus be represented as:

$$H=[H_1 H_2 \ldots H_K]_{M,NK}$$

where $H_1, H_2, \ldots H_K$ each represent the characterizations of the wireless paths between the N receiving antennas and the transmitting antennas of one of the K transmission points.

In block 408, a precoding information matrix $V_{NK,NK}$, may be derived from the composite channel matrix H using a singular value decomposition (SVD) of the composite channel matrix H as follows:

$$H=U_{M,M}\Sigma_{M,NK}V^+_{NK,NK}$$

where $V^+_{NK,NK}$ is the conjugate transpose of $V_{NK,NK}$, $U_{M,M}$ is a unitary matrix, and $\Sigma_{M,NK}$ is a diagonal matrix containing singular values of the composite channel matrix H. The SVD of the composite channel matrix H may be performed so that the singular values of the diagonal matrix $\Sigma_{M,NK}$ are in descending order of magnitude.

In block 410, a rank of transmission R for the precoding information matrix may be determined based on the singular values within the diagonal matrix $\Sigma_{M,NK}$. The singular values may represent the quality of potential data streams transmitted to the mobile unit. Based on the quality of the potential data streams, the rank of transmission R for the system may be selected. In some embodiments, the rank of transmission R may be based on the quality of the potential data streams being above a threshold value. In circumstances where the quality of all the potential data streams are below a threshold value, the potential data stream with the highest quality may be selected and the rank of transmission R would be set at one.

In block 412, the precoding information matrix $V_{NK, NK}$ may be culled based on the determined rank of transmission R to remove information related to any unselected potential data stream(s) so that $V_{NK,NK}$ becomes $V_{NK, R}$.

In block 414, a transmission point may be selected from the K number of transmission points. Once selected, a precoding information matrix V for the selected transmission point may be produced from the precoding information matrix $V_{NK,R}$, where $V=V_{N,R}$.

In block 416, a subset of possible codewords may be selected from a set of predefined codewords. In some embodiments, the subset of codewords from the predefined codewords may be selected based on a number of transmitting antennas on the selected transmission point and the number of N receiving antennas of the mobile unit.

In block 418, a codeword $W_1$ from the selected subset of codewords may be selected.

In block 420, an amplitude $\alpha$ for a data signal being manipulated by the selected codeword $W_1$ may be calculated. The amplitude $\alpha$ may be calculated as follows:

$$V=W_1 W_2,$$

$$W_2=((W_1)^+ W_1)^{-1}(W_1)^+ V,$$

$$\alpha=\|W_2\|_F.$$

where the $^+$ indicates the conjugate transpose of $W_1$ and $W_2$ is a variable used in calculating the amplitude $\alpha$ and a phase rotation $R_L$. In some embodiments, the amplitude $\alpha$ may be quantized.

In block 422, the phase rotation $R_L$ for a data signal being manipulated by the selected codeword $W_1$ may be calculated. The phase rotation $R_L$ may be calculated as follows:

$$R_L=\text{proj}_{UL}(W_2)$$

where $\text{proj}_{UL}(\ )$ is the matrix projection operation that outputs the projection of a matrix on the unitary space (which is the unitary matrix that is closest to the input matrix), In some embodiments, the phase rotation $R_L$ may be quantized to $QR_L$.

In block 424, a difference between the precoding information matrix V for the selected transmission point and the selected codeword may be calculated as follows:

$$\text{Dist\_chord}(V, \alpha W_1 QR_L)$$

In block 426, it may be determined if there are additional codewords in the selected subset of codewords that have not be analyzed to determine the difference between the precoding information matrix V for the selected transmission point and the additional codewords. When there are additional codewords, the method 400 may return to block 418 and may repeat blocks 418, 420, 422, 424, and 426 for each additional codeword in the selected subset of codewords so that the difference between each codeword in the selected subset of codewords and the precoding information matrix V has been determined.

When it is determined at block 426 that there are no additional codewords, the method 400 may proceed to block 428. In block 428, a codeword for the selected transmission point is selected. The differences between each codeword in the selected subset of codewords and the precoding information matrix V may be compared. The codeword with the smallest difference may be selected as the codeword for the selected transmission point.

In block 430, it may be determined if there are additional transmission points for which a codeword has not been selected. When there are additional transmission points for which a codeword has not been selected, the method 400 may return to block 414 and repeat blocks 414, 416, 418, 420, 422, 424, 426, 428, and 430 until a codeword has been selected for each transmission point. When there are no additional transmission points determined at block 430, the method 400 may terminate.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A mobile wireless unit for determining precoding for a wireless signal, the mobile wireless unit comprising:
    a plurality of receiving antennas;
    a derivation module configured to determine precoding information for a composite channel, the composite channel representing characterizations of a plurality of wireless paths established between the plurality of receiving antennas and a plurality of transmitting antennas, the plurality of transmitting antennas being distributed among a plurality of base stations and/or remote radio heads; and
    a selection module configured to select a codeword for each base station or remote radio head from a subset of predefined codewords based on the precoding information, the codeword for each base station or remote radio head being used to manipulate data signals sent over the wireless paths established between the plurality of receiving antennas and the plurality of transmitting antennas of the respective base station or remote radio head, wherein the selection module is configured to select the codeword for one of the base stations or remote radio heads by:
        designating one of the predefined codewords in the subset of the predefined codewords as a designated codeword;
        determining one or more of a phase rotation for the data signals and an amplitude for the data signals based on the precoding information and the designated codeword;
        generating a modified codeword based on the designated codeword and the one or more of the phase rotation and the amplitude;
        comparing the precoding information to the modified codewords to determine a difference between the precoding information and the modified codewords;
        repeating designating one of the predefined codewords, determining the phase rotation and/or the amplitude, generating the modified codeword, and comparing for at least two of the codewords in the subset of the codewords; and
        selecting the codeword based on the determined differences.

2. The mobile wireless unit according to claim 1, wherein the derivation module determines the precoding information based on a singular value decomposition of the composite channel.

3. The mobile wireless unit according to claim 1, wherein the selection module determines the phase rotation for the data signals and the amplitude for the data signals based on a subset of the precoding information, wherein the subset of the precoding information is selected based on a rank of transmission determined by the derivation module.

4. The mobile wireless unit according to claim 1, wherein the selection module selects the codeword for one of the base stations and/or remote radio heads independently from selecting the codeword for another of the base stations and/or remote radio heads.

5. The mobile wireless unit according to claim 1, wherein the subset of predefined codewords for each base station or remote radio head is selected based on a number of the plurality of receiving antennas and a number of the plurality of transmitting antennas of the respective base station or remote radio head.

6. The mobile wireless unit according to claim 1, wherein the selection module comprises a phase module configured to determine the phase rotation for the data signals based on the precoding information.

7. The mobile wireless unit according to claim 1, wherein the selection module comprises an amplitude module configured to determine the amplitude for the data signals based on the precoding information.

8. The mobile wireless unit according to claim 1, wherein the plurality of receiving antennas receive, from at least one of the base stations and/or remote radio heads, data signals that are encoded by the codeword selected for the at least one base station or remote radio head.

9. A method of determining precoding for a wireless signal, the method comprising:
    deriving precoding information for a composite channel at a mobile wireless unit, the composite channel representing characterizations of a plurality of wireless paths established between a plurality of receiving antennas of the mobile wireless unit and a plurality of transmitting antennas, the plurality of transmitting antennas being distributed among a plurality of base stations and/or remote radio heads;
    designating a codeword from a set of predefined codewords as a designated codeword;
    determining one or more of a phase rotation for data signals sent over the wireless paths established between the plurality of receiving antennas and the plurality of transmitting antennas and an amplitude for the data signals based on the precoding information and the designated codeword;
    generating a modified codeword based on the designated codeword and the one or more of the phase rotation and the amplitude;
    comparing the precoding information to the modified codeword to determine a difference between the precoding information and the modified codeword;
    repeating designating the codeword, determining the phase rotation and/or the amplitude, generating the modified codeword, and comparing the precoding information to the modified codeword; and
    selecting a particular codeword based on the determined differences,
    the particular codeword for the one of the base stations or remote radio heads being used to manipulate data signals sent over the wireless paths established between the plurality of receiving antennas and the plurality of transmitting antennas of the one of the base stations or remote radio heads.

10. The method according to claim 9, wherein deriving the precoding information includes performing a singular value decomposition of the composite channel.

11. The method according to claim 9, wherein the phase rotation for the data signals and the amplitude for the data signals for each designated codeword is selected based on a subset of the precoding information, the subset of the precoding information being selected based on a rank of transmission determined based on the composite channel.

12. The method according to claim 9, wherein the particular codeword for the one of the base stations and/or remote radio heads is selected independently from another particular codeword for another of the base stations and/or remote radio heads.

13. The method of claim 9, further comprising producing specific precoding information for each of the base stations and/or remote radio heads from the precoding information derived from the composite channel, wherein the particular codeword selected for the one of the base stations or remote radio heads is based on the specific precoding information produced for the one of the base stations or remote radio heads.

14. The method of claim 13, wherein the modified codeword is based on the designated codeword, the phase rotation, and the amplitude;
wherein the step of repeating designating the codeword, determining the phase rotation and/or the amplitude, generating the modified codeword, and comparing the precoding information to the modified codeword is performed for all of the codewords in the set of the codewords, and the particular codeword is selected based on the particular codeword having a smallest associated difference; and
wherein designating the codeword, determining the phase rotation and/or the amplitude, generating the modified codeword, comparing all of the codewords, repeating, and selecting the particular codeword is performed to select the particular codeword for each of the plurality of base stations or remote radio heads.

15. The method of claim 13, further comprising:
determining a rank of transmission for the precoding information based on a singular value decomposition of the precoding information; and
culling the precoding information based on the rank of transmission, wherein the specific precoding information is produced from the culled precoding information.

16. A processor in a mobile wireless unit, the processor configured to execute computer instructions to cause a system to perform operations for determining precoding for a wireless signal, the operations comprising:
deriving precoding information for a composite channel, the composite channel representing characterizations of a plurality of wireless paths established between a plurality of receiving antennas of the mobile wireless unit and a plurality of transmitting antennas, the plurality of transmitting antennas being distributed among a plurality of base stations and/or remote radio heads; and
selecting a codeword at the mobile wireless unit for each base station or remote radio head from a subset of predefined codewords based on the precoding information, the codeword for each base station or remote radio head being used to manipulate data signals sent over the wireless paths established between the plurality of receiving antennas and the plurality of transmitting antennas of the respective base station or remote radio head, wherein selecting the codeword for one of the base stations or remote radio heads includes:
designating one of the predefined codewords in the subset of the predefined codewords as a designated codeword;
determining one or more of a phase rotation for the data signals and an amplitude for the data signals based on the precoding information and the designated codeword;
generating a modified codeword based on the designated codeword and the one or more of the phase rotation and the amplitude;
comparing the precoding information to the modified codewords to determine a difference between the precoding information and the modified codewords;
repeating designating one of the predefined codewords, determining the phase rotation and/or the amplitude, generating the modified codeword, and comparing for at least two of the codewords in the subset of the codewords; and
selecting the codeword based on the determined differences.

17. The processor according to claim 16, wherein deriving the precoding information includes performing a singular value decomposition of the composite channel.

18. The processor according to claim 16, wherein the phase rotation for the data signals and the amplitude for the data signals are based on a subset of the precoding information, the subset of the precoding information being selected based on a rank of transmission determined based on the composite channel.

19. The processor according to claim 16, wherein the codeword for one of the base stations and/or remote radio heads is selected independently from the codeword for another of the base stations and/or remote radio heads.

* * * * *